(12) United States Patent
Roesch et al.

(10) Patent No.: US 8,655,825 B2
(45) Date of Patent: Feb. 18, 2014

(54) EFFICIENT MANAGEMENT OF DATA QUALITY FOR STREAMING EVENT DATA

(75) Inventors: Philipp Roesch, Dresden (DE); Sebastian Weng, Dresden (DE)

(73) Assignee: SAP AG, Walldorf (DE)

( * ) Notice: Subject to any disclaimer, the term of this patent is extended or adjusted under 35 U.S.C. 154(b) by 242 days.

(21) Appl. No.: 13/044,681

(22) Filed: Mar. 10, 2011

(65) Prior Publication Data

US 2012/0233107 A1  Sep. 13, 2012

(51) Int. Cl.
*G06N 5/00* (2006.01)
*G06N 5/02* (2006.01)

(52) U.S. Cl.
CPC ........................ *G06N 5/025* (2013.01)
USPC ................................ 706/47; 714/39; 709/224

(58) Field of Classification Search
USPC ............................................................ 706/47
See application file for complete search history.

(56) References Cited

U.S. PATENT DOCUMENTS

| | | | |
|---|---|---|---|
| 2005/0033250 A1* | 2/2005 | Collette et al. | 604/361 |
| 2006/0149407 A1* | 7/2006 | Markham et al. | 700/108 |
| 2008/0268823 A1* | 10/2008 | Shalev et al. | 455/415 |
| 2010/0167658 A1* | 7/2010 | Hoffman | 455/67.11 |
| 2012/0143733 A1* | 6/2012 | Kappauf | 705/32 |

OTHER PUBLICATIONS

A. Klein et al., "Representing Data Quality in Sensor Data Streaming Environments," Journal of Data and Information Quality, vol. 1, Issue 2, Article No. 10, Sep. 2009, pp. 1-17.
Monica Scannapieco et al., "The DaQuinCIS Architecture: a Platform for Exchanging and Improving Data Quality in Cooperative Information Systems," Information Systems, vol. 29, Issue 7, 2004, pp. 551-582.
Veda C. Storey et al., "Extending the ER Model to Represent Data Quality Requirements," Data Quality, Advances in Database Systems, vol. 23, 2001, pp. 37-48.
Veda C. Storey et al., "Modeling Quality Requirements in Conceptual Database Design," Proceedings of the 3rd International Conference on Information Quality, 1998, pp. 64-87.
Richard Y. Wang et al., "A Framework for Analysis of Data Quality Research," IEEE Transitions on Knowledge and Data Engineering, vol. 7, Issue 4, Aug. 1995, pp. 623-640.

* cited by examiner

*Primary Examiner* — Alan Chen
*Assistant Examiner* — Kalpana Bharadwaj
(74) *Attorney, Agent, or Firm* — Fish & Richardson P.C.

(57) ABSTRACT

Implementations of the present disclosure include methods for managing data quality for event data. In some implementations, methods include receiving, at one or more computing devices, a plurality of events, each event comprising event data and being generated by an event source in response to a real-world activity, processing, using the one or more computing devices, the plurality of events using one or more complex event processing (CEP) rules to generate a complex event, in response to generating the complex event, annotating the complex event with quality information corresponding to each of the plurality of events to provide a quality-enriched event, and publishing the quality-enriched event.

17 Claims, 3 Drawing Sheets

EFFICIENT MANAGEMENT OF DATA QUALITY FOR STREAMING EVENT DATA

BACKGROUND

Cooperating businesses look toward closer cooperation across existing company borders and between several business partners to achieve improved economic competitiveness and a better reaction to market requirements. Resultant business processes are accompanied by an asynchronous, heterogeneous, loosely coupled and distributed communication via mostly technical low-level event data. To make this event data accessible to business experts or decision makers, the event data can be consolidated and aggregated to higher abstraction levels. This can be achieved using complex event processing (CEP) systems.

Fast and dynamic adaptation of business processes is advantageous to companies. In order to capture the current status of a business process, event data can be analyzed. For example, business experts or decision makers can draw conclusions and make decisions based on incoming event data. In event-based environments, low-level events are provided by event producers and are aggregated to higher level, business relevant events. Business experts and decision makers are able to adapt business processes based on the aggregated events. Further, business experts need to be able to trust and comprehend the aggregated events in order to react appropriately. To derive reasonable and business relevant decisions from aggregated event data, a responsible business expert has to analyze and explore the data.

SUMMARY

Implementations of the present disclosure include computer-implemented methods for managing data quality for event data. In some implementations, methods include receiving, at one or more computing devices, a plurality of events, each event comprising event data and being generated by an event source in response to a real-world activity, processing, using the one or more computing devices, the plurality of events using one or more complex event processing (CEP) rules to generate a complex event, in response to generating the complex event, annotating the complex event with quality information corresponding to each of the plurality of events to provide a quality-enriched event, and publishing the quality-enriched event.

In some implementations, the quality information is determined based on each of the plurality of events. The quality information includes a number of the plurality of events that contribute to the complex event. The quality information includes one or more timestamps, each of the one or more timestamps corresponding to an event of the plurality of events.

In some implementations, methods further include determining an event source identifier, determining event source quality information based on the event source identifier, and transmitting the event source quality information for use by one or more event-based applications. In some implementations, methods further include receiving an event identifier, wherein the event source identifier is based on the event identifier. In some implementations, the event source quality information includes static quality information. In some implementations, the event source quality information further includes quasi-static quality information. In some implementations, the event source quality information includes quasi-static quality information. In some implementations, determining event source quality information includes: indexing a database using the event source identifier, and retrieving the event source quality information from the database, the database being provided as a computer-readable storage medium. In some implementations, methods further include receiving the event source quality information, and storing the event source quality information to a database, the database being provided as a computer-readable storage medium. In some implementations, methods further include subscribing for published quality information, wherein receiving the event source quality information is in response to subscribing and publication of the event source quality information. In some implementations, methods further include receiving event information, the event information corresponding to an event source associated with the event source identifier, and updating the event source quality information based on the event information.

In some implementations, publishing includes transmitting the quality-enriched event for use by one or more event-based applications.

In some implementations, methods further include comparing a quality value of the quality information to a threshold quality value, and discarding the quality information when the quality value is less than the threshold quality value.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
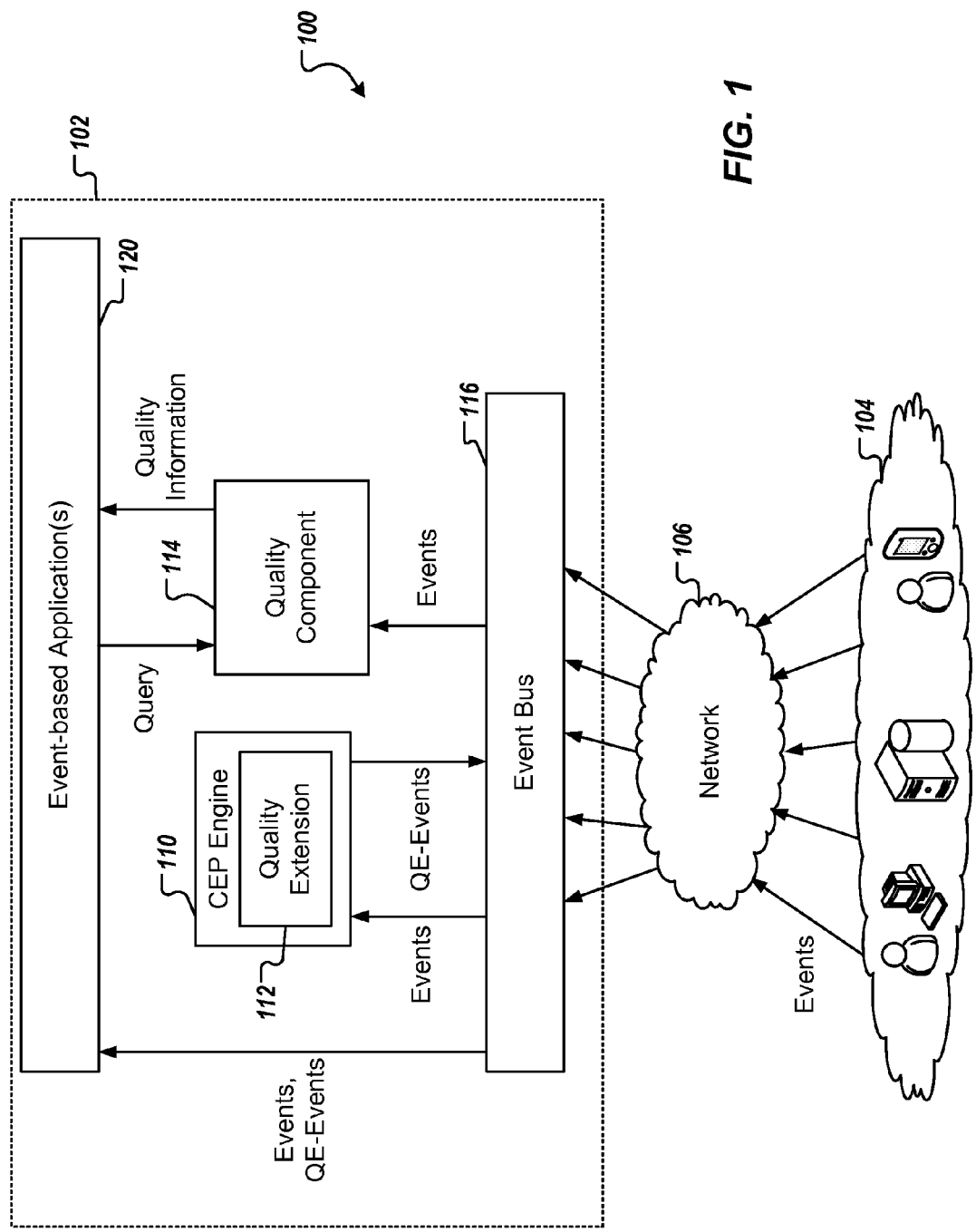
FIG. 1 depicts an example system architecture that can perform implementations of the present disclosure.

In general, events are generated by event sources and each event includes data that represents the occurrence of a real-world event. A non-limiting example event can include data indicating that a particular radio frequency identification (RFID) tag was scanned at a particular time and at a particular location. Another non-limiting example event can include a measurement generated by a sensor that monitors a parameter (e.g., temperature, velocity, proximity). Example events can include identification data (e.g., identifying an RFID tag or a sensor), time data, location data, event type data and event name data. CEP includes the processing of streaming events occurring across all layers of one or more organizations to identify relevant events, and to recognize an occurrence of a complex event.

A complex event can include a pattern that is recognized within the streaming events. The pattern can be recognized based on one or more rules that are processed by a CEP engine and that are applied using a plurality of events. By way of non-limiting example, a rule can include: if a rate of movement of a component exceeds a threshold rate, and if a temperature of the component exceeds a threshold temperature, a component failure condition may be imminent. Using this example, a complex event includes a component failure imminent event that is recognized as the pattern: a component rate being greater than a threshold component rate and a component temperature being greater than a threshold component temperature.

By way of another non-limiting example, events of a first type (e.g., purchase events) can be monitored over time to show the number of active customers in a store within a specified time period, and events of a second type (e.g., number of certain products in stock) can also be monitored. An example rule can include: if more than X events of the first type occur within the specified time period, and the value of an event of the second type for product Y is below Z, a complex event can be generated and can include a notification that the supply of product Y is running low for the current sales traffic.

By way of another non-limiting example, events of a first type (e.g., shipment delay) and events of a second type (e.g., obstructions along a planned shipment route (e.g., traffic jam)) can be monitored. An example rule can include: if the estimated delay (e.g., based on current delay and estimated traffic jam delay) is greater than a threshold Y, a complex event can be generated and can include a notification that a particular shipment is heavily delayed, and/or the particular shipment will miss being loaded onto a plane.

The example events that result in the complex event are each provided from event sources. Using sensors as a non-limiting example, and with reference to the example complex event described above, the component rate can be detected based on a speed sensor that is responsive to movement of the component and generates a signal based thereon. The signal can be processed to provide the component rate. The component temperature can be detected based on a temperature sensor that is responsive to a temperature of the component and generates a signal based thereon. The signal can be processed to provide the component temperature. Continuing with the component failure imminent example above, the structure of the corresponding complex event can include: the event type (e.g., "alert"), the event ID, a timestamp, and/or the payload, which is a set of special attributes of an event (e.g., a temperature reading, a history of temperature readings, a rate reading and/or a history of rate readings).

CEP further includes the analysis of events and/or complex events, the impact that each may have on the one or more organizations and taking subsequent action in real-time in response to such events. Quality information is highly relevant for the decision making process. For appropriate actions and well-founded decisions, decision makers (e.g., business experts) should be aware of the quality of the information that decisions are to be based upon. Quality information enables decision makers to identify event sources having low quality, for example. Events generated by such event sources may be less of a consideration, or event not considered at all for decision making. Events generated by high quality event sources may play a larger role in decision making. Consequently, quality information can also be used to optimize the event stream environment. These benefits also hold for the application field of business activity monitoring where events are aggregated to complex events, such as key performance indicators (KPIs), that monitor business processes and business critical resources. Other fields of application can include market data analyses and sensor networks. In the market data analysis field, for example, stock and resource prices are regarded as events that are analyzed continuously and in (near) real-time to detect trends or changes in order to quickly react. In the sensor network field, the focus is on monitoring, where events from devices are collected and combined to more confident and meaningful events. In these example application fields, quality information provides valuable insight into the usefulness of the incoming events and the event sources. With data quality information at hand, users can assess the value of events which highly contributes to better decision support.

Accordingly, and to enable effective adaptation of business processes in response to event occurrences, implementations of the present disclosure provide quality information corresponding to events and/or event sources. Implementations of the present disclosure include quality enrichment of generated events and access to stored quality information, as well as components and techniques for the collection of the required information. More particularly, implementations of the present disclosure address the field of rule-based event processing, where complex events are generated based on rules and in response to the occurrence of other events. As discussed in further detail herein, sending, receiving and routing of the events can be based on a publish/subscribe paradigm, where event sources publish events and interested parties subscribe for receipt of published events. Implementations of the present disclosure enable users (e.g., decision makers) to have access to and consider quality information in making decisions based on events and/or complex events.

Referring now to FIG. 1, an example system architecture 100 can be used to perform implementations of the present disclosure. The example system architecture 100 includes one or more computing devices 102 that receive one or more events from one or more event sources 104 over a network 106. The one or more computing devices 102 and/or the one or more event sources 104 can include various forms of processing devices including, but not limited to, desktop computers, laptop computers, handheld computers, personal digital assistant (PDAs), cellular telephones, network appliances, smart phones, enhanced general packet radio service (EG-PRS) mobile phones, or a combination of any two or more of these example data processing devices or other data processing devices. The one or more computing devices 102 and/or the one or more event sources 104 can represent various forms of servers including, but not limited to a web server, an application server, a proxy server, a network server, or a server farm. Further, the one or more event sources 104 can include various forms of sensors and/or readers that are responsive to an environment and/or machine-readable tags. Example sensors can include a temperature sensor, a motion detector, a proximity sensor, an accelerometer, a machine-readable code reader, and/or an RFID reader. Example machine-readable tags can include tags having machine-readable code printed thereon (e.g., bar code, QR code) and/or RFID tags.

The network 106 can include a large computer network, such as a local area network (LAN), wide area network (WAN), the Internet, a cellular network, or a combination thereof connecting any number of mobile clients, fixed clients, and servers. In some implementations, client computing devices can communicate with server computing devices via a virtual private network (VPN), Secure Shell (SSH) tunnel, or other secure network connection. In some implementations, the network 106 can include a corporate network (e.g., intranet) and one or more wireless access points.

The one or more computing devices 102 include a CEP engine module 110 having a quality extension 112, a quality component 114, an event bus module 116, and one or more event-based applications 120. The CEP engine module 110 can be provided as one or more computer programs that are executed using one or more processors of the computing devices 102. The quality extension module 112 can be provided as a sub-module of the CEP engine module 110 and can be provided as one or more computer programs that are executed using one or more processors of the computing devices 102. The quality component 114 can be can be provided as one or more computer programs that are executed using one or more processors of the computing devices 102, and/or can be provided as a computer-readable medium of the computing devices 102 for storing quality information. The event bus module 116 can be provided as one or more computer programs that are executed using one or more processors of the computing devices 102.

The event-based applications 120 can be provided as one or more computer programs that are executed using one or more processors of the computing devices 102. In general, the event-based applications 120 receive events, as discussed in further detail herein, and provide output to a user. As also discussed herein, the one or more event-based applications 120 can request quality information, which quality information can be provided from the quality component 114. The user can include a human user and/or a programmatic user. An example event-based application includes a business process management (BPM) application, such as NetWeaver BPM provided by SAP AG of Walldorf, Germany.

With continued reference to FIG. 1, the one or more event sources 104 publish events that are provided to the event bus module 116 through the network 106. The event bus module 116 filters and routes the received events. Events can be filtered based on event source. For example, a subscriber can request events from a particular system, and the events are filtered based on the particular system to publish those events to the particular subscriber. As an alternative, or in addition to, events can be filtered based on content. For example, a subscriber can request events regarding a particular topic. As another example, a subscriber can request events having a value that exceeds a specified threshold. The event bus module 116 routes the events to the event-based applications 120, the CEP engine module 110 and the quality component 114. The CEP engine module 110 processes the streaming events as they are received to generate complex events. In particular, the CEP engine module 110 processes the received events in view of one or more pre-stored or pre-programmed rules that are used to recognize patterns of the events. In this manner, a pattern can be recognized based on application of one or more of the rules to the incoming events, and a complex event can be generated based thereon.

The quality extension module 112 extends the event processing within the CEP engine module 110 by adding or otherwise enriching the events (e.g., events and/or complex events) with quality information to provide quality-enriched (QE) events. The quality information provided by the quality extension module 112 can include dynamic quality information provided as metadata that is appended to the subject event. In particular, dynamic quality information can be specific to the individual events. Example dynamic quality information can include the timeliness or the completeness of a particular event. The dynamic quality information is maintained as part of the events themselves.

In some implementations, at least some of the dynamic quality information can be derived from the information that is part of the received event data (e.g., timeliness of a complex event can be computed based on the timestamp information of the contributing events). In some implementations, other parts of the dynamic quality information are calculated by the CEP engine module 110. By way of non-limiting example, the CEP engine module 110 can calculated the completeness of a complex event based on the actual number of contributing events and the expected number of contributing events (e.g., computed based on an event rate that can be provided as static quality information retrieved by the quality component 114, and the time interval as determined based on the rule or the timestamps of the contributing events).

To track and propagate dynamic quality criteria (e.g., from an event to a complex event that results at least in part from the event), the quality extension module 112 annotates aggregated or newly created events with the dynamic quality information. By way of non-limiting example, a newly generated complex event can be annotated with the number of contributing events that resulted in generation of the complex event. In this example, the number of contributing events is provided as the dynamic quality information. This example dynamic quality information can be used to asses an average value based on aggregated measurements (e.g., more measurements produce more meaningful average values). By way of another non-limiting example, a newly generated complex event can be annotated with timeliness information (e.g., an interval length that can be determined as the difference between the oldest timestamp and the newest timestamp from the contributing events; the average time between occurrence of the contributing events). The dynamic quality information appended to an event can include a combination of dynamic quality information (e.g., the number of contributing events and timeliness information).

The manner in which the dynamic quality information is propagated for composite events can be defined by the event consumers (e.g., the one or more event-based applications 120 and/or users thereof). For example, the propagation of the dynamical quality information can be defined as part of the rules processed by the CEP engine module 110. Consequently, a user can define how to propagate the quality information within a rule.

The quality information can also include static quality information and quasi-static quality information. Static quality information includes quality information that is intrinsic to the production of a particular event. By way of non-limiting example, static quality information can include the accuracy of measured and/or calculated values. For example, an event source can include a sensor that measures a particular parameter. The sensor may have an associated accuracy (e.g., ±X units). The accuracy of the event source can be provided as static quality information, such that a value measured by the event source includes the associated accuracy (e.g., 15° C.±0.5° C.). In the case of calculated values, the static quality information can include the aggregate accuracy of a plurality of event sources that produce the values used to calculate the calculated value. By way of another non-limiting example, static quality information can include an event rate (e.g., the rate at which an event occurred).

Quasi-static quality information includes quality information that may slowly change over time. By way of non-limiting example, a confidence in a measured value may be determined based on a variance of a plurality of measured values over time. The confidence can be incrementally updated as more measured values are provided. Other example quasi-static quality information can include a variance (e.g., reflecting the stability of the event source), a mean value of a series of measurements (e.g., to judge whether a value may be an outlier), and/or the completeness of the event source (e.g., to judge whether the completeness of a specific complex event is abnormal/very different from an expected completeness).

In accordance with implementations of the present disclosure, the quality component 114 stores static quality information and quasi-static quality information. In some implementations, the quality component subscribes to events that are published by the one or more event sources 104 through the event bus 116. The actual value of the static quality information can be provided as part of a published event. For example, the accuracy of a sensor that generated an event can be included as part of the published event information. For each event source, the quality component 114 stores the static quality information. For example, an event source can include an associated event source identification that is provided in the published event information. The quality component 114 can store the accuracy of the event source in a database and can index the stored information using the event source identification.

With regard to quasi-static quality information, the quality component can generate the quasi-static information associated with a particular event, and can store the quasi-static quality information in a database. The quasi-static quality information can be indexed using an event identification (event ID) and/or the event source identification (event source ID), and can be updated by the quality component 114 as new events from a particular event source are received. In some implementations, the event ID can include, or can otherwise be used to determine the event source ID. In some implementations, the event source ID can be provided in the event data associated with a particular event.

As discussed above, the one or more event-based applications 120 can receive events generated by the one or more event source 104 and/or one or more quality-enriched events generated by the CEP engine 110. Through the quality-enriched events, the one or more event-based applications 120 receive corresponding dynamic quality information. The one or more event-based applications 120, and/or users thereof, can query the quality component 114 to retrieve static quality information and/or quasi-static quality information associated with one or more events. For example, an event-based application 120 can generate a query that is received by the quality component 114. The query can include an identifier, such as an event ID and/or an event source ID. The query can indicate the type of quality information sought (e.g., static and/or quasi-static). The quality component 114 can access the quality information based on the identifier. For example, the quality component 114 can use the identifier as an index to a database for retrieving the quality information. In response to the query, the quality component 114 can transmit the quality information to the querying event-based application 120.

Implementations of the present disclosure provide an efficient means for tracking, propagating and making available quality information that can include dynamic quality information, static quality information and/or quasi-static quality information. In accordance with implementations of the present disclosure, a minimal amount of metadata for quality information is transmitted. Consequently, the tracking of quality information is efficiently provided with requiring low network traffic. Implementations of the present disclosure further provide flexibility by easily enabling the addition or removal of quality information that is to be tracked. For example, users can classify quality information as static, quasi-static or dynamic and can add the respective logic to propagate or maintain the quality information. Having quality information of events available allows the application of early filtering. For example, quality requirements for events can be defined. If an event has a lower quality than a threshold quality (e.g., the lowest acceptable quality) the particular event is not distributed. This reduces network traffic and reduces the load of the CEP engine.

Figure 2:
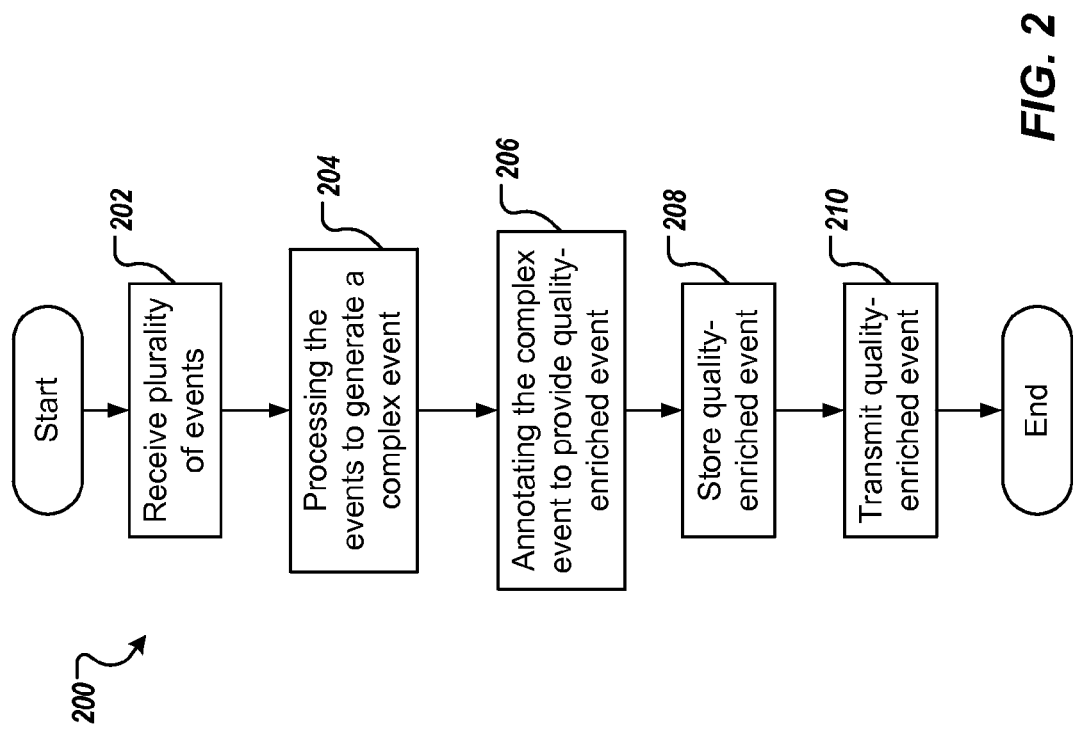
FIG. 2 depicts an example process for enriching events with quality data in accordance with implementations of the present disclosure.

FIG. 2 is a flow diagram of an example process 200 that can be executed in accordance with implementations of the present disclosure. A plurality of events is received (202). Each event of the plurality of events includes event data and is generated by an event source in response to a real-world activity. For example, and with reference to FIG. 1, one or more of the event sources 104 can generate one or more events of the plurality of events, and can publish the events for distribution through the event bus 116. The CEP engine 110, which is provided by one or more computing devices, can subscribe to published events, and can receive the plurality of events. The plurality of events is processed using one or more CEP rules to generate a complex event (204). For example, and with continued reference to FIG. 1, the CEP engine 110 can process the plurality of events to generate one or more complex events.

In response to generating the complex event, the complex event is annotated with quality information that corresponds to each of the plurality of events to provide a quality-enriched event (206). For example, and with continued reference to FIG. 1, the CEP engine 110 can annotate the complex event with quality information to provide the quality-enriched event. In some implementations, the quality-enriched event can be stored in an event archive provided as a computer-readable storage medium (208). The quality-enriched event is transmitted for use by one or more event-based applications. For example, and with continued reference to FIG. 3, the CEP engine 110 can publish the quality-enriched event for distribution through the event bus 116. The one or more event-based applications 120 can subscribe for published, quality-enriched events.

Figure 3:
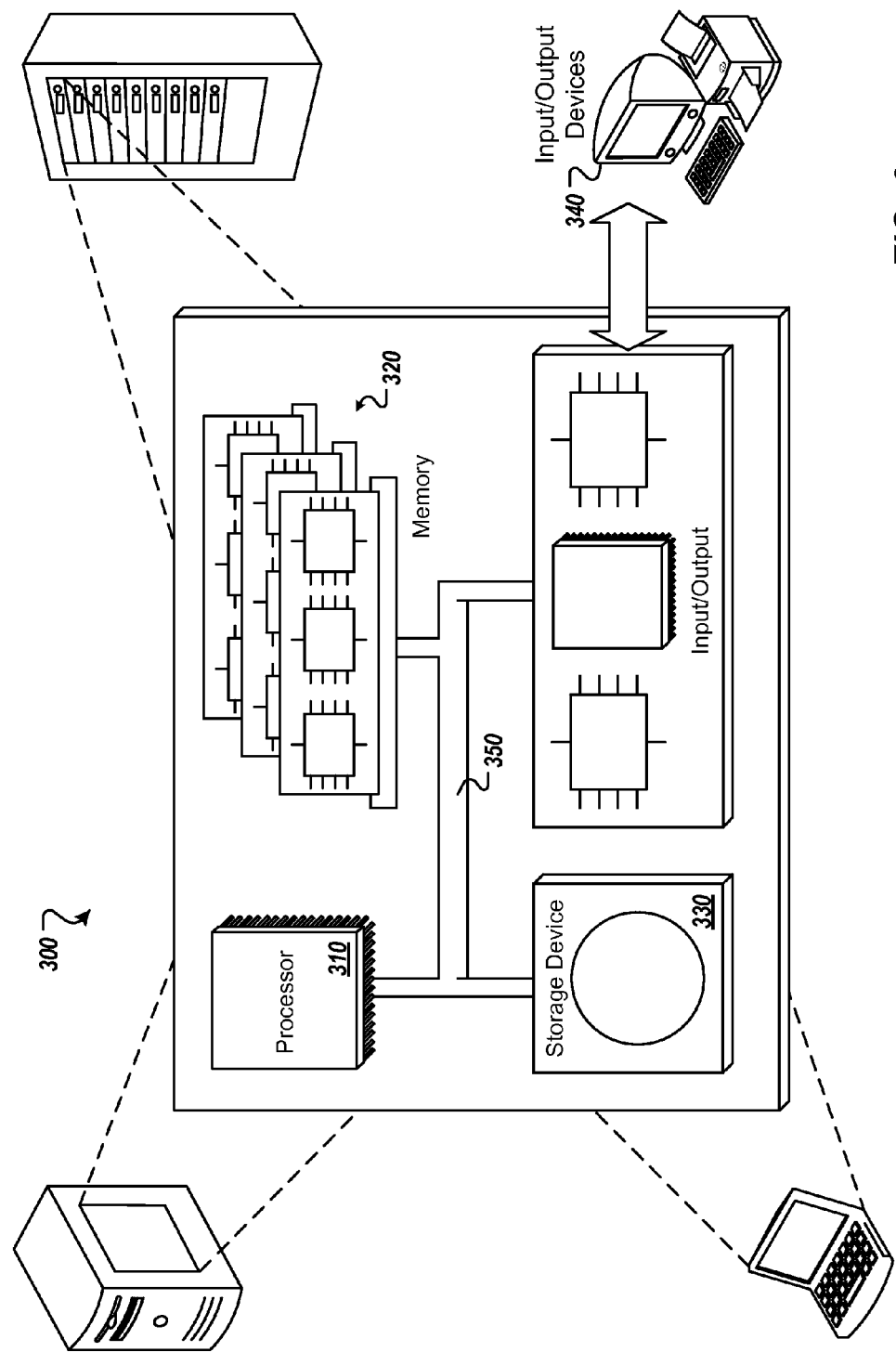
FIG. 3 is a schematic illustration of example computer systems that can be used to execute implementations of the present disclosure.

Referring now to FIG. 3, a schematic diagram of an example computing system 300 is provided. The system 300 can be used for the operations described in association with the implementations described herein. For example, the system 300 may be included in any or all of the server components discussed herein. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit. The storage device 330 is capable of providing mass storage for the system 300. In one implementation, the storage device 330 is a computer-readable medium. In various different implementations, the storage device 330 may be a floppy disk device, a hard disk device, an optical disk device, or a tape device. The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing data quality for event data, the method comprising:
receiving, at one or more computing devices, a plurality of events, each event comprising event data and being generated by an event source in response to a real-world activity;
processing, using the one or more computing devices, the plurality of events using one or more complex event processing (CEP) rules to generate a complex event, the CEP rules being used to recognize a pattern of events from the plurality of events, the complex event corresponding to the pattern of events;
in response to generating the complex event, annotating the complex event with quality information corresponding to each of the plurality of events to provide a quality-enriched event; and
publishing the quality-enriched event.

2. The method of claim 1, wherein the quality information is determined based on each of the plurality of events.

3. The method of claim 2, wherein the quality information comprises a number of the plurality of events that contribute to the complex event.

4. The method of claim 2, wherein the quality information comprises one or more timestamps, each of the one or more timestamps corresponding to an event of the plurality of events.

5. The method of claim 1, further comprising:
determining an event source identifier;
determining event source quality information based on the event source identifier; and
transmitting the event source quality information for use by one or more event-based applications.

6. The method of claim 5, further comprising receiving an event identifier, wherein the event source identifier is based on the event identifier.

7. The method of claim 5, wherein the event source quality information comprises static quality information.

8. The method of claim 7, wherein the event source quality information further comprises quasi-static quality information.

9. The method of claim 5, wherein the event source quality information comprises quasi-static quality information.

10. The method of claim 5, wherein determining event source quality information comprises:
   indexing a database using the event source identifier; and
   retrieving the event source quality information from the database, the database being provided as a computer-readable storage medium.

11. The method of claim 5, further comprising:
   receiving the event source quality information; and
   storing the event source quality information to a database, the database being provided as a computer-readable storage medium.

12. The method of claim 11, further comprising subscribing for published quality information, wherein receiving the event source quality information is in response to subscribing and publication of the event source quality information.

13. The method of claim 5, further comprising:
   receiving event information, the event information corresponding to an event source associated with the event source identifier; and
   updating the event source quality information based on the event information.

14. The method of claim 1, wherein publishing comprises transmitting the quality-enriched event for use by one or more event-based applications.

15. The method of claim 1, further comprising:
   comparing a quality value of the quality information to a threshold quality value; and
   discarding the quality information when the quality value is less than the threshold quality value.

16. A non-transitory computer-readable storage medium coupled to one or more processors and having instructions stored thereon which, when executed by the one or more processors, cause the one or more processors to perform operations for managing data quality for event data, the operations comprising:
   receiving a plurality of events, each event comprising event data and being generated by an event source in response to a real-world activity;
   processing the plurality of events using one or more complex event processing (CEP) rules to generate a complex event, the CEP rules being used to recognize a pattern of events from the plurality of events, the complex event corresponding to the pattern of events;
   in response to generating the complex event, annotating the complex event with quality information corresponding to each of the plurality of events to provide a quality-enriched event; and
   publishing the quality-enriched event.

17. A system, comprising:
   a computing device; and
   a computer-readable storage device coupled to the computing device and having instructions stored thereon which, when executed by the computing device, cause the computing device to perform operations for managing data quality for event data, the operations comprising:
      receiving a plurality of events, each event comprising event data and being generated by an event source in response to a real-world activity;
      processing the plurality of events using one or more complex event processing (CEP) rules to generate a complex event, the CEP rules being used to recognize a pattern of events from the plurality of events the complex event corresponding to the pattern of events;
      in response to generating the complex event, annotating the complex event with quality information corresponding to each of the plurality of events to provide a quality-enriched event; and
      publishing the quality-enriched event.

* * * * *